United States Patent [19]
Daly

[11] Patent Number: 5,639,319
[45] Date of Patent: Jun. 17, 1997

[54] WHEEL WITH MOLASSES BALLAST AND METHOD

[76] Inventor: Glendon C. Daly, 5976 Bois Isle Dr., Haslett, Mich. 48840

[21] Appl. No.: 511,375

[22] Filed: Aug. 4, 1995

[51] Int. Cl.[6] ..................................................... B60C 1/00
[52] U.S. Cl. ..................... 152/450; 152/310; 152/DIG. 5; 141/38; 156/112
[58] Field of Search ................... 152/154.1, DIG. 5, 152/151, 246, 310, 502, 503, 504, 521, 450; 156/145, 115, 112, 113, 110.1; 141/38

[56] References Cited

U.S. PATENT DOCUMENTS

| | | | |
|---|---|---|---|
| 447,993 | 3/1891 | Whittemore, Jr. | 152/310 |
| 598,613 | 2/1898 | Lucas | 152/503 |
| 820,738 | 5/1906 | Sanderson | 152/DIG. 5 |
| 918,189 | 4/1909 | McCord et al. | 152/503 |
| 1,083,188 | 12/1913 | Clark | 152/310 |
| 1,257,778 | 2/1918 | Allen . | |
| 1,427,747 | 8/1922 | Ledwinka . | |
| 1,470,901 | 10/1923 | Whitehead . | |
| 2,311,901 | 2/1943 | Palko | 152/DIG. 5 |
| 2,378,384 | 6/1945 | Baker | 152/DIG. 5 |
| 2,797,721 | 7/1957 | Hicks . | |
| 2,847,049 | 8/1958 | Blomquist | 152/DIG. 5 |
| 2,884,039 | 4/1959 | Hicks . | |
| 3,003,536 | 10/1961 | Culberson et al. . | |
| 3,008,506 | 11/1961 | Hicks . | |
| 3,208,501 | 9/1965 | Askins . | |
| 3,230,999 | 1/1966 | Hicks . | |
| 3,312,265 | 4/1967 | Turner et al. . | |
| 3,716,093 | 2/1973 | Tsuchiya . | |
| 4,489,790 | 12/1984 | Lattin . | |

OTHER PUBLICATIONS

Kirk–Othmer, Third Edition, vol. 21, pp. 901 to 920 (1983).
Buzzanell, P. et al, The Sugarbeet Grower, pp. 11 to 14 (1993).

*Primary Examiner*—Geoffrey L. Knable
*Attorney, Agent, or Firm*—Ian C. McLeod; Mary M. Moyne

[57] ABSTRACT

A wheel (10) having a tire (12) is provided with a liquid molasses as a ballast (100). The tire can be tubeless or can contain a tube (28). The molasses is preferably desugared (less than 30% by weight sucrose) and is able to sustain a temperature of −30° F. (−34.4° C. and below) without freezing. The molasses is non-toxic, non-corrosive and non-abrasive and is environmentally friendly. Farm, utility, industrial, lawn and garden and commercial vehicles use ballasted tires.

17 Claims, 5 Drawing Sheets

WHEEL WITH MOLASSES BALLAST AND METHOD

BACKGROUND OF THE INVENTION

(1) Field of the Invention

The present invention relates to a wheel having a pneumatic tire filled with liquid molasses as a ballast. In particular, the present invention preferably relates to a wheel having a pneumatic tire essentially completely filled with liquid desugared molasses to provide the ballast.

(2) Description of the Related Art

Molasses is a well known material. It is known in the very old arts to use dilute aqueous solutions as a rust remover.

The related art shows wheels with tires filled with a variety of liquid materials as ballasts. Illustrative are U.S. Pat. No. 1,257,778 to Allen; U.S. Pat. No. 1,427,747 to Ledwinka; U.S. Pat. No. 1,470,901 to Whitehead; 2,797,721 to Hicks; U.S. Pat. No. 2,884,039 to Hicks; U.S. Pat. No. 3,003,536 to Culberson et al; U.S. Pat. No. 3,008,506 to Hicks; U.S. Pat. No. 3,208,501 to Askins; U.S. Pat. No. 3,230,999 to Hicks; U.S. Pat. No. 3,312,265 to Turner et al; U.S. Pat. No. 3,716,093 to Tsuchiya and U.S. Pat. No. 4,489,790 to Lattin.

In particular, Hicks '721 describes the use of high viscosity liquids, between 300 cps and 10,000 cps absolute viscosity at 70° F., as a fluid ballast for tires. The several types of liquids used as the ballast include: barytes (barium sulphate) water and cornstarch; calcium chloride, barytes, water and cornstarch; carboxy methyl cellulose, water and barytes (this combination can only be used in a non-freeze climate); barytes, calcium chloride, fuller's earth and water; iron oxide pigment, calcium chloride, fuller's earth and water; barytes, bentonite and water; calcium chloride, water, cornstarch; and water and high velocity animal glue.

Hicks '949 shows the use of a mineral composition with a cushioning agent as ballast for a vehicle tire. The cushioning agent is usually a lightweight particle having occluded air therein. The cushioning agent could be expanded minerals, expanded plastics, or expanded rubbers (natural or synthetic). Solid materials break down and are difficult to insert into the tire.

There remains a need for a wheel with a tire filled with a liquid ballast material where the ballast material will flow in very low temperatures (−30° F. and below), which is easily inserted into the tire and which will not cause corrosion of the metal rim supporting the tire. There is a need for a product which is biodegradable and environmentally safe to plants, animals and humans.

OBJECTS

Therefore, it is an object of the present invention to provide a wheel having a tire filled with a liquid ballast material which will flow in very low temperatures. Further, it is an object of the present invention to provide a wheel with a tire filled with the liquid ballast material which can be easily inserted into the tire using a hand, centrifugal, piston or gear pump. Still further, it is an object of the present invention to provide a wheel having a tire filled with a non-corrosive, liquid ballast material. Further still, it is an object of the present invention to provide a wheel having a tire filled with a liquid ballast material which is inexpensive and which has a density of about 8 to 13 pounds per gallon (0.95 to 1.5 kg/liter). These and other objects will become increasingly apparent by reference to the following drawings and to the description.

DETAILED DESCRIPTION OF THE PREFERRED EMBODIMENTS

Figure 1:
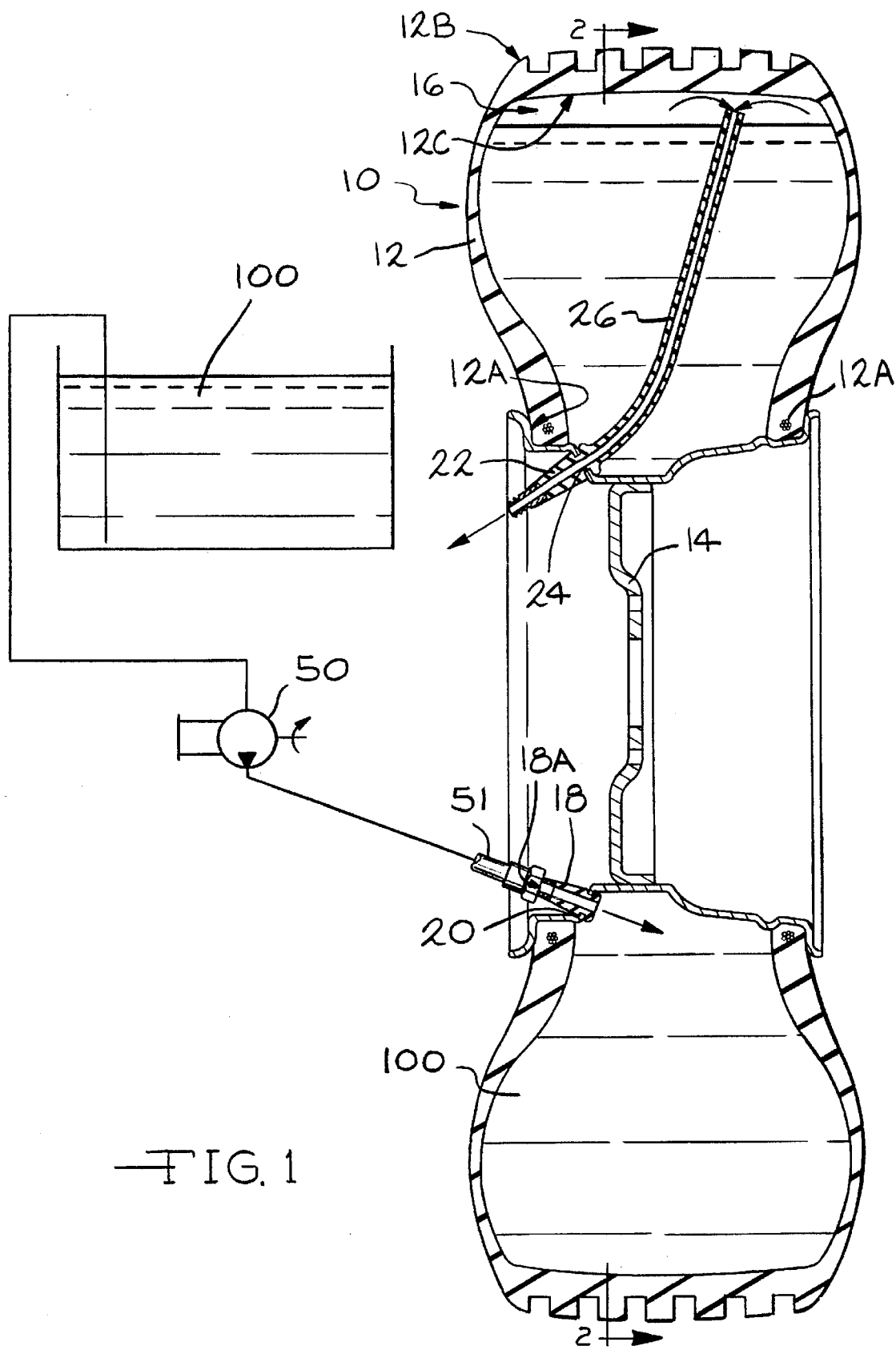
FIG. 1 is a front cross-sectional view of the wheel 10 showing the input valve 18 for filling a tubeless tire 12 with the ballast material 100 and the air escape valve 22.

The present invention relates to a vehicle wheel including a rim and a pneumatic type tire mounted on the rim wherein the tire contains a composition comprising a liquid molasses as a ballast. The present invention also relates to a method for providing a ballasted wheel including a rim and a pneumatic type tire and having a filler means for filling the tire, which comprises: filling the tire through the filler means with liquid molasses in an amount sufficient to provide a ballast for the tire; and sealing the filler means to provide the ballasted wheel. The tire can be tubeless or can be a tube type.

Molasses contains all its natural sugars and is normally a beet, sorghum, or cane molasses. Desugared sugar beet molasses (preferably containing hydrogenated protein and amino acids) has had most of the sucrose sugar removed (less than about 30% by weight sucrose). Unlike desugared cane molasses, which has only salt water as its final by-product, desugared sugar beet molasses has betaine, carbohydrates, cell wall amino acids, and contains 35–89% by weight solids from the beet fiber. The desugared molasses contains about 18% proteins, 15% sugars, 18% carbohydrates, 16% potassium salts, all by weight and the remainder is water. The processed desugared material weighs 8.0 to 11.6 lbs. per gallon (0.95 to 1.4 kg/liter) vs. 11.7 lbs. per gallon (1.40 kg/liter) for regular molasses.

There are sugar plants that also produce desugared sugar beet molasses in Minnesota, North Dakota, Nebraska, Texas and Idaho and other locations around the world. Producers are Holly Sugar, Western Sugar, Southern Minnesota Sugar, Great Lakes Sugar and American Capital Sugar. These plants use the Steffen process, the ion exclusion process or chromatographic separation to produce the desugared molasses. Currently, sugar beets are the only molasses products being desugared; however, other forms of molasses will be desugared in the near future, particularly cane molasses. The hydrogenated protein amino acid molasses is less attractive to insects and the like. The desugared molasses flows at very low temperatures (−30° F., −34.4° C.) and can be pumped with a hand, centrifugal, piston, or gear pump at ambient temperatures. The desugared molasses is considered a waste product, since the sucrose has been removed but is still safe for use as animal feeds and soil building agents.

The price of desugared molasses is less than half of that of regular molasses. Cane molasses, beet molasses, or other molasses are all food grade. Desugared molasses is feed grade and is not for human consumption. It is however non-toxic, non-abrasive, non-corrosive, biodegradable and environmentally friendly. Thus, molasses is generally recognized as being safe in foods. The molasses can be animal feed, human food or industrial grade. The molasses will not affect tire gauges used to check air in tires.

It has been found that the molasses can be combined with inorganic salts commonly used for ballast such as calcium chloride or magnesium chloride, if the amount is less than about fifty percent (50%) by weight. For reasons which are not understood, the molasses, particularly the desugared molasses, protects the metal of the rim from rusting and actually removes rust from the rim. Thus, such compositions using inorganic salts are unnecessary and are not preferred. Also unexpectedly, the molasses remains in a fluid state and does not freeze and become solid even at temperatures as low as −30° F. (and below).

In the preferred embodiment, the ballast material is essentially only molasses. Molasses compositions are produced as a by-product from corn, soybean, sorghum, cane or sugar beet, lumber (lignin) products. The process which produces sugar beet or cane molasses is described in Kirk-Othmer, Third Edition, Volume 21, pages 904 to 920 (1983) and by Buzzanell, P. et al, *The Sugarbeet Grower*, pages 11 to 14 (1993). Cane molasses is available in dried form from Westway Trading Corporation, Minneapolis, Minn.

It is preferred to use an antifoam agent with the molasses to prevent foam formation. A preferred antifoam agent is a liquid silicone polymer (dimethylopolysiloxane) such as FOAM BUSTER™ from Helena Chemical Company, Memphis, Tenn. The agent is used in an amount which reduces foaming particularly, between about 0.1 and 3 percent by weight of the molasses.

It is also preferred to add enhancers to reduce the musty smell. These include food flavors and perfumes. For instance, flavors from Food Flavors, Inc. can be used. The enhancers are preferably food or feed grade to prevent problems with animals which might inadvertently drink the molasses.

Figure 2:
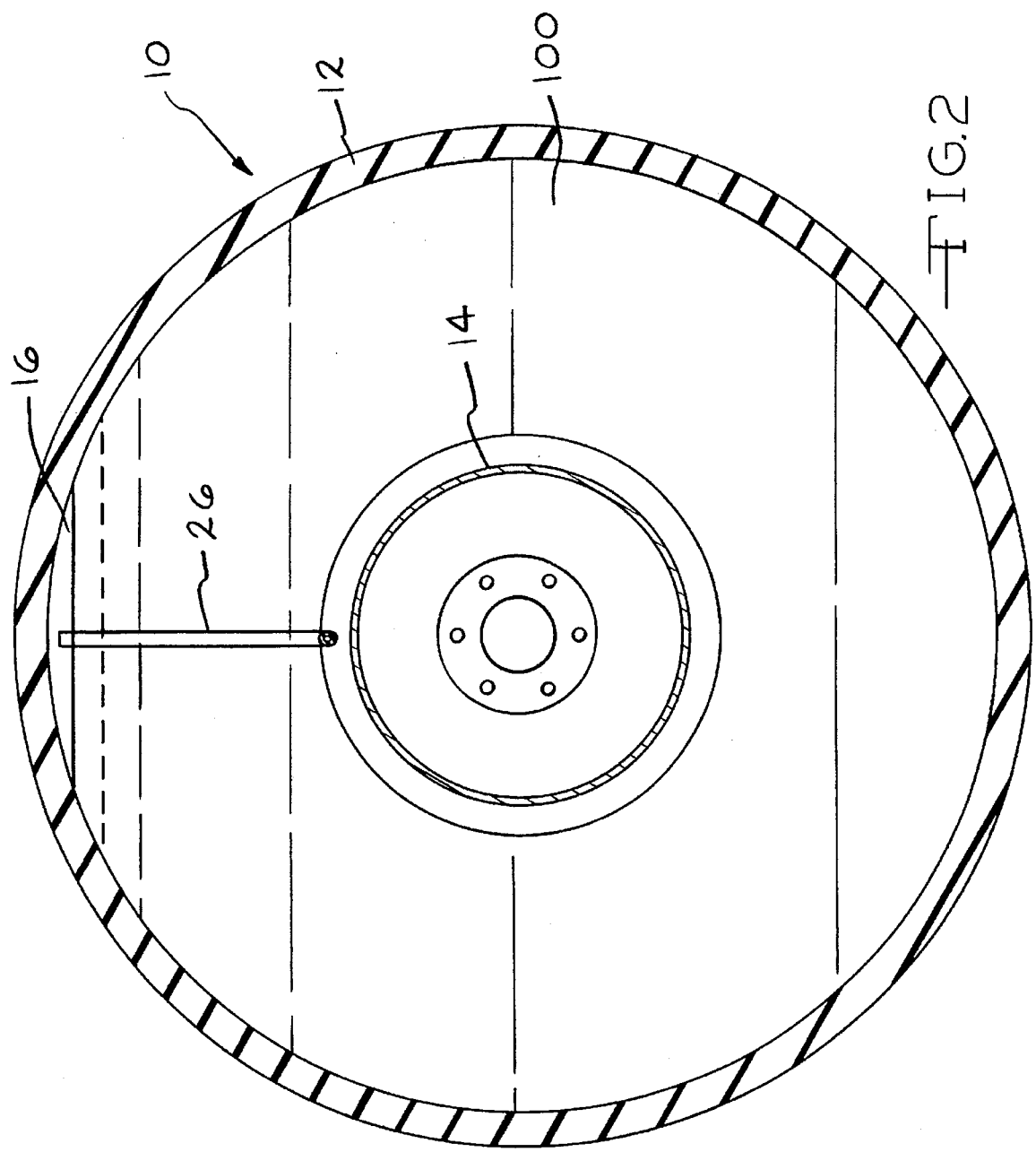
FIG. 2 is a side cross-sectional view of the wheel 10 showing the ballast material 100 in the tire 12.
Figure 3:
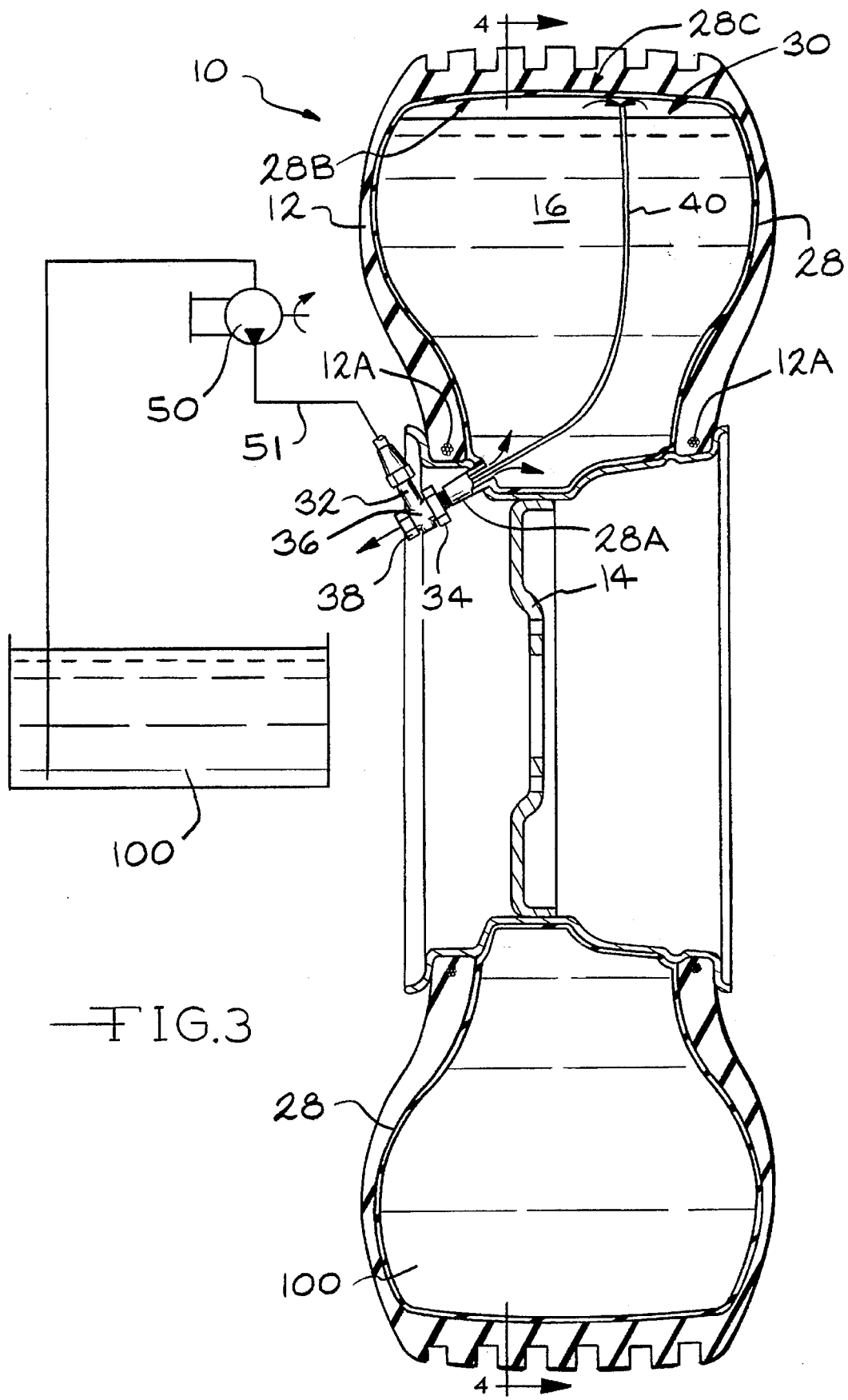
FIG. 3 is a front cross-sectional view of the alternate embodiment of the wheel 10 showing a tube 28 in the tire 12 and the combination valve 32.
Figure 4:
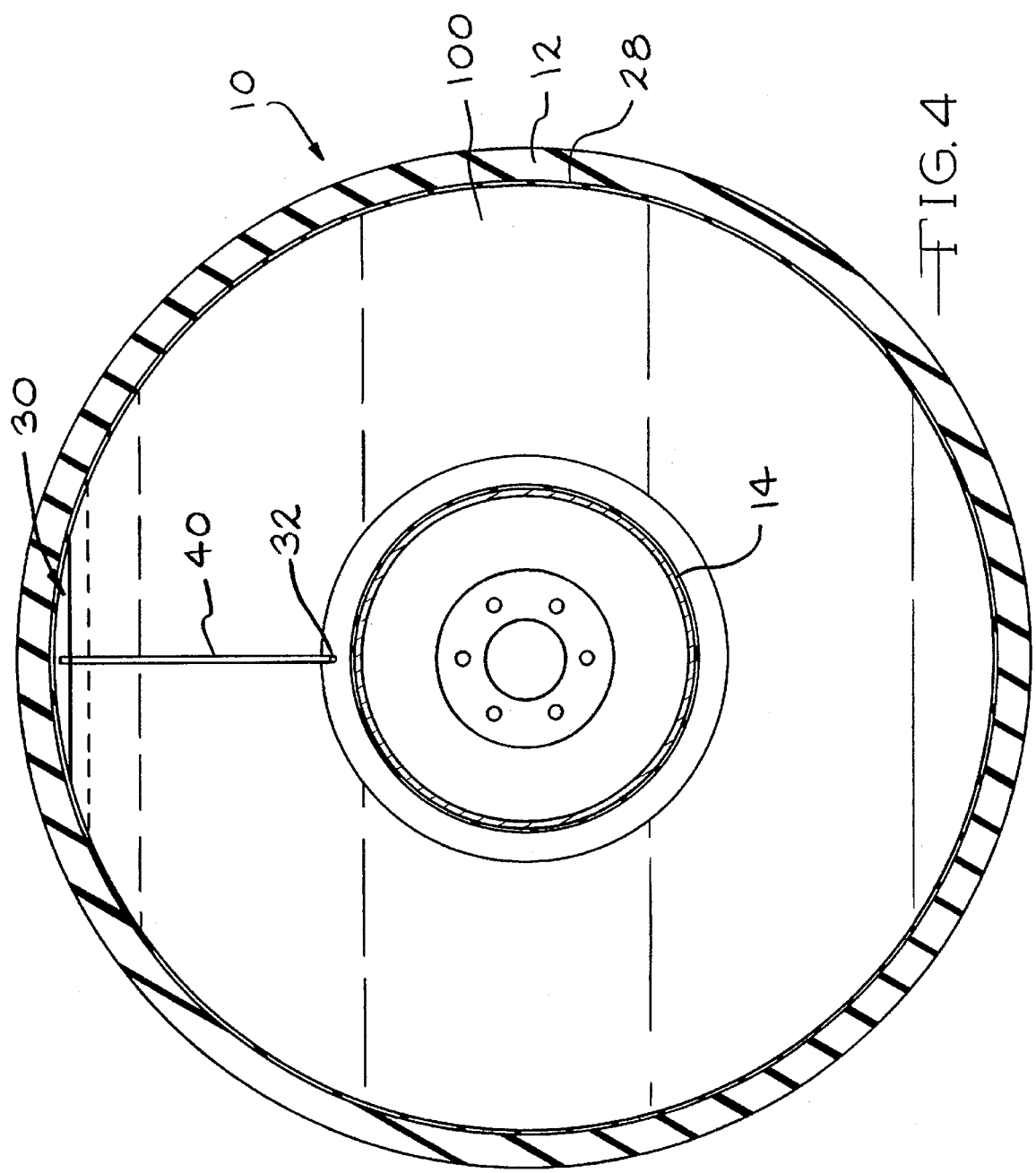
FIG. 4 is a side cross-sectional view of the wheel 10 of FIG. 3.

FIGS. 1 and 2 show the preferred embodiment of the wheel 10 with a pneumatic tubeless tire 12 being filled with a ballast material 100. FIGS. 3 and 4 show the alternate embodiment of the wheel 10 with a pneumatic tire 12 having a tube 28 filled with the ballast material 100. The wheel 10 is preferably similar to a conventional wheel and has a tire 12 mounted on a rim 14. In the preferred embodiment, the cavity 16 of the tire 12 is preferably filled with the ballast material 100. Preferably, the bead 12A of the tire 12 is sealed around the rim 14 such that the ballast material 100 can not leak out of the cavity 16 between the tire 12 and the rim 14. A ballast input valve 18 is located through a hole 20 in the rim 14 and into the cavity 16 of the tire 12. Preferably, the valve 18 is of such a configuration that a centrifugal, piston or gear pump 50 can be attached by a flow line 51 to the mouth 18A of the valve 18. In the preferred embodiment, the valve 18 is a one way valve such that the ballast material 100 can be introduced into the cavity 16 and not exit from the cavity 16. An air escape valve 22 is also provided through a hole 24 in the rim 14 into the cavity 16 of the tire 12. The escape valve 22 is preferably provided with a flexible air tube 26 connected to the side of the valve 22 inside the cavity 16. The air tube 26 preferably extends through the cavity 16 of the tire 12 from the valve 22 to the outer circumference 12B of the tire 12 and stops slightly spaced apart from the inside surface 12C of the tire 12 (FIG. 1). In the preferred embodiment, the escape valve 22 is also a one way valve similar to the input valve 18 except in the opposite direction thus, the escape valve 22 allows air and possibly ballast material 100 to escape the cavity 16 but does not let air back into the cavity 16. The escape valve 22 is preferably located on the same side of the wheel 10 as the input valve 18 to allow easy access to the valves 18 and 22 once the wheel 10 has been mounted on the vehicle. In the preferred embodiment, the valves 18 and 22 are spaced apart on the rim 14 of the wheel 10 about 180°.

Figure 5:
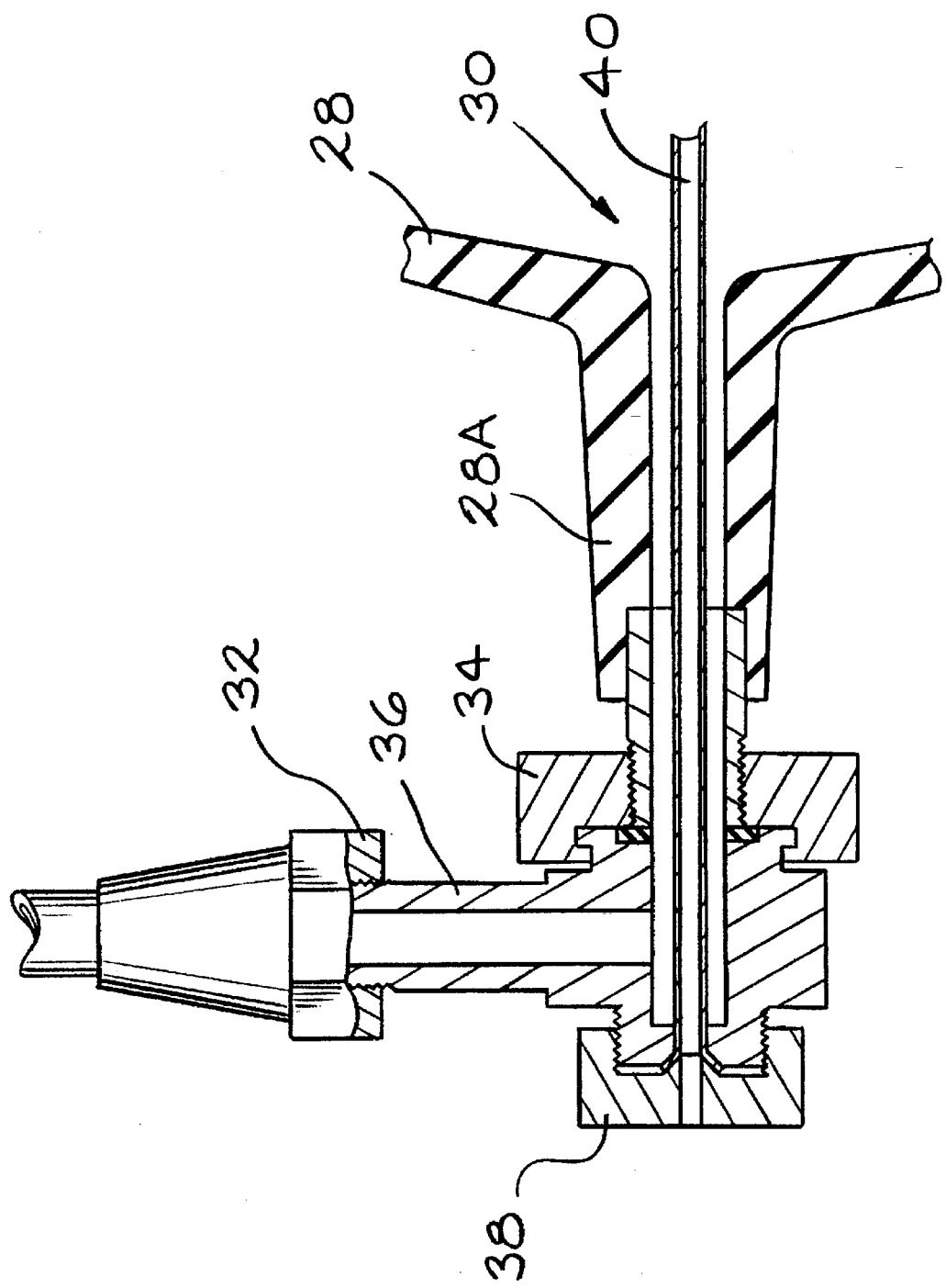
FIG. 5 is a cross-sectional view of the combination valve 32 showing the air escape line 40 and the tube valve 28A.

In the alternate embodiment, as shown in FIGS. 3 and 4, the wheel 10 has a tire 12 mounted on a rim 14 and a pneumatic type tube 28 within the tire 12. The cavity 30 of the tube 28 is filled with the ballast material 100. The wheel 10 is preferably similar to conventional wheels having tubes. Preferably, the tube 28 is similar to the conventional pneumatic tire tubes and is provided with a tube valve 28A for inflating the tube 28. A combination valve 32 is preferably provided which allows for filling the tube 28 with the ballast material 100 while simultaneously allowing the displaced air to exit through the valve 32 (FIG. 5). The valve 32 preferably has a spinner nut 34, a central valve 36, a tube flange nut 38 and an air escape line 40 which extends completely through the valve 32 into the inside cavity 30 of the tube 28. The combination valve 32 is preferably constructed such that the central valve 36 is spaced between the flange nut 38 and the spinner nut 34. The spinner nut 34 is preferably constructed such as to be able to be connected to the tube valve 28A of the tube 28. Preferably, the escape line 40 extends completely across the cavity 30 of the tube 28 to a point adjacent to and spaced apart from the inner surface 28B of the outer circumference 28C of the tube 28. The pump 50 for the ballast material 100 is preferably connected to the tube flange nut 38 of the valve 32 by a flow line 51 (FIG. 3). Alternately, two separate valves (not shown) such as used in the preferred embodiment can be used instead of the combination valve 32.

IN USE

In the preferred embodiment of FIGS. 1 and 2, the tire 12 is mounted onto the rim 14 of the wheel 10 and the wheel 10 is mounted on the vehicle (not shown). The vehicle is preferably a farm, industrial, utility, lawn or garden tractor or some other type of commercial vehicle or equipment. Preferably when mounted, the wheel 10 is completely deflated. The wheel 10 is preferably mounted such that the input valve 18 is spaced below the air escape valve 22 and adjacent to the ground surface (not shown). The wheel 10 is preferably mounted on the vehicle such that the valves 18 and 22 are on the outside of the wheel 10 and easily accessible by the user (not shown) with the wheel 10 raised off the ground. Next, the flow line 51 of the pump 50 for the ballast material 100 is connected to the mouth 18A of the input valve 18 and the air escape valve 22 is opened. The pump 50 is then activated such as to move the liquid ballast material 100 into the cavity 16 of the tire 12. The tire 12 is filled with the liquid ballast material 100 until no air is escaping from the air escape valve 22 or alternatively, until the liquid ballast material 100 begins to escape through air escape valve 22. The pump 50 is then deactivated and the flow line 51 is disconnected from the wheel 10 and the air escape valve 22 is closed.

In the alternate embodiment of FIGS. 3 and 4, the wheel 10 with the tire 12 and the tube 28 is mounted on the vehicle. When the wheel 10 is mounted, the tube 28 is preferably completely deflated. The wheel 10 is mounted such that the tube valve 28A is at an upper point of the wheel 10. The combination valve 32 is then connected to the tube valve 28A and the flow line 51 of the ballast pump 50 is connected to the valve 32. Next, the pump 50 is activated and the fluid ballast material 100 is moved into the cavity 30 of the tube 28. The tube 28 is filled until no more air escapes from the air escape line 40 of the valve 32 or until the ballast material 100 begins to escape from the cavity 30 through the air escape line 40. The pump 50 is then deactivated and the flow line 51 is removed from the valve 32. The valve 32 can then be removed from the tube valve 28A and a cap (not shown) inserted on the tube valve 28A of the tube 28. In each embodiment, each wheel 10 of the vehicle is filled with the ballast material 100.

Preferably in both embodiments, the cavity 16 or 30 of the tire 12 or tube 28 is completely filled with the ballast material 100. The cavity 16 or 30 however, can also be only partially filled. However, the more ballast material 100 in the wheel 10 the heavier the wheel 10.

It is intended that the foregoing description be only illustrative of the present invention and that the present invention be limited only by the hereinafter appended claims.

I claim:

1. A vehicle wheel including a rim and a pneumatic tire mounted on the rim, wherein the tire contains a composition which is fluid comprising a liquid molasses as a ballast and wherein the composition remains fluid in use and protects the rim from rusting.

2. The wheel of claim 1 wherein the tire is a farm tractor tire.

3. The wheel of claim 1 wherein the molasses is desugared molasses.

4. The wheel of claim 3 wherein the composition consists essentially of molasses which has been desugared to contain less than about 30 percent by weight sucrose.

5. The wheel of claim 1 wherein the molasses is sugar beet molasses which is desugared and has been hydrogenated.

6. The wheel of claim 1 wherein the tire is tubeless and the molasses is in contact with the tire.

7. The wheel of claim 1 wherein the tire contains a tube inside which includes the molasses.

8. A method for providing a ballasted wheel including a rim and a pneumatic tire and having a filler means for filling the tire, which comprises:

(a) filling the tire through the filler means with a composition which is fluid comprising a liquid molasses in an amount sufficient to provide a ballast for the tire; and (b) sealing the filler means to provide the ballasted wheel, wherein the composition remains fluid in use and protects the rim from rusting.

9. The method of claim 8 wherein the tire is a farm, industrial, utility or lawn and garden tractor tire.

10. The method of claim 8 wherein the molasses which is used in the filling is desugared molasses.

11. The method of claim 10 wherein the composition consists essentially of molasses which has been desugared to contain less than about 30 percent by weight sucrose.

12. The method of claim 8 wherein the molasses used in the filling is desugared sugar beet molasses.

13. The method of claim 8 wherein the tire is tubeless so that the molasses comes in contact with the rim.

14. The method of claim 8 wherein the tire contains a tube with a tube valve for inflating the tube which provides the filler means.

15. The method of claim 12 wherein the molasses has been hydrogenated.

16. The method of claim 8 wherein the tire is tubeless and wherein the tire includes the molasses.

17. The method of claim 8 wherein the tire contains a tube inside and the tube includes the molasses.

* * * * *